(12) United States Patent
Chung et al.

(10) Patent No.: US 11,206,371 B2
(45) Date of Patent: Dec. 21, 2021

(54) TECHNIQUES TO OVERCOME COMMUNICATION LAG BETWEEN TERMINALS PERFORMING VIDEO MIRRORING AND ANNOTATION OPERATIONS

(71) Applicant: Apple Inc., Cupertino, CA (US)

(72) Inventors: Chris Y. Chung, Sunnyvale, CA (US); Dazhong Zhang, Milpitas, CA (US); Hsi-Jung Wu, San Jose, CA (US); Xiaosong Zhou, Campbell, CA (US)

(73) Assignee: Apple Inc., Cupertino, CA (US)

( * ) Notice: Subject to any disclaimer, the term of this patent is extended or adjusted under 35 U.S.C. 154(b) by 392 days.

(21) Appl. No.: 15/495,095

(22) Filed: Apr. 24, 2017

(65) Prior Publication Data

US 2017/0230614 A1 Aug. 10, 2017

Related U.S. Application Data

(63) Continuation of application No. 14/727,471, filed on Jun. 1, 2015, now Pat. No. 9,654,727.

(51) Int. Cl.
| | |
|---|---|
| *H04N 7/14* | (2006.01) |
| *H04N 7/15* | (2006.01) |
| *H04L 29/06* | (2006.01) |
| *H04N 21/242* | (2011.01) |
| *H04N 21/43* | (2011.01) |
| *H04N 5/14* | (2006.01) |
| *G06F 40/169* | (2020.01) |
| *H04N 19/136* | (2014.01) |

(52) U.S. Cl.
CPC ........... *H04N 7/147* (2013.01); *G06F 40/169* (2020.01); *H04L 65/403* (2013.01); *H04L 65/601* (2013.01); *H04N 5/147* (2013.01); *H04N 7/15* (2013.01); *H04N 7/155* (2013.01); *H04N 21/242* (2013.01); *H04N 21/4307* (2013.01); *H04N 19/136* (2014.11)

(58) Field of Classification Search
CPC combination set(s) only.
See application file for complete search history.

(56) References Cited

U.S. PATENT DOCUMENTS

| | | |
|---|---|---|
| 2008/0100694 A1 | 5/2008 | Barkley et al. |
| 2011/0235709 A1 | 9/2011 | Shi et al. |
| | (Continued) | |

FOREIGN PATENT DOCUMENTS

WO 99/46702 A1 9/1999

*Primary Examiner* — Phung-Hoang J Nguyen
(74) *Attorney, Agent, or Firm* — BakerHostetler

(57) ABSTRACT

Techniques are disclosed for overcoming communication lag between interactive operations among devices in a streaming session. According to the techniques, a first device streaming video content to a second device and an annotation is entered to a first frame being displayed at the second device, which is communicated back to the first device. Responsive to a communication that identifies the annotation, a first device may identify an element of video content from the first frame to which the annotation applies and determine whether the identified element is present in a second frame of video content currently displayed at the first terminal. If so, the first device may display the annotation with the second frame in a location where the identified element is present. If not, the first device may display the annotation via an alternate technique.

18 Claims, 6 Drawing Sheets

(56) References Cited

U.S. PATENT DOCUMENTS

| | | |
|---|---|---|
| 2013/0027425 A1 | 1/2013 | Yuan |
| 2013/0129252 A1 | 5/2013 | Lauper et al. |
| 2013/0223525 A1* | 8/2013 | Zhou ................... H04N 19/105 375/240.12 |
| 2013/0325970 A1* | 12/2013 | Roberts .............. H04N 21/4788 709/206 |
| 2014/0063174 A1* | 3/2014 | Junuzovic ............ G06Q 10/101 348/14.02 |
| 2016/0180743 A1* | 6/2016 | Ahmad ............... G06F 19/3418 434/262 |

* cited by examiner

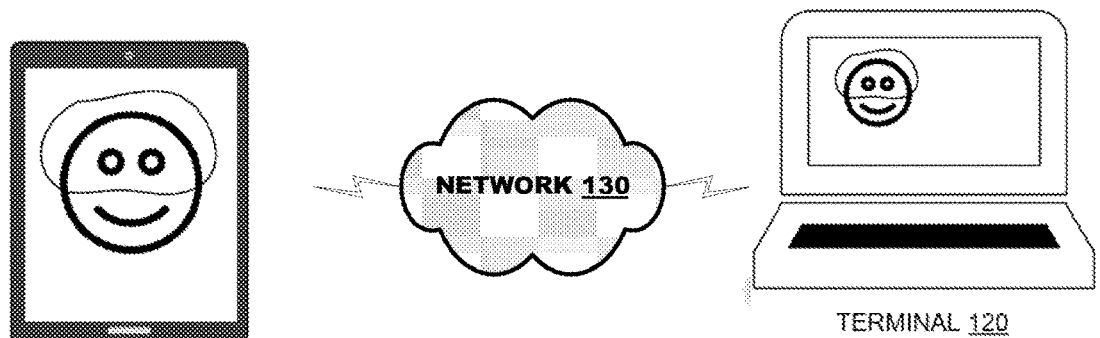
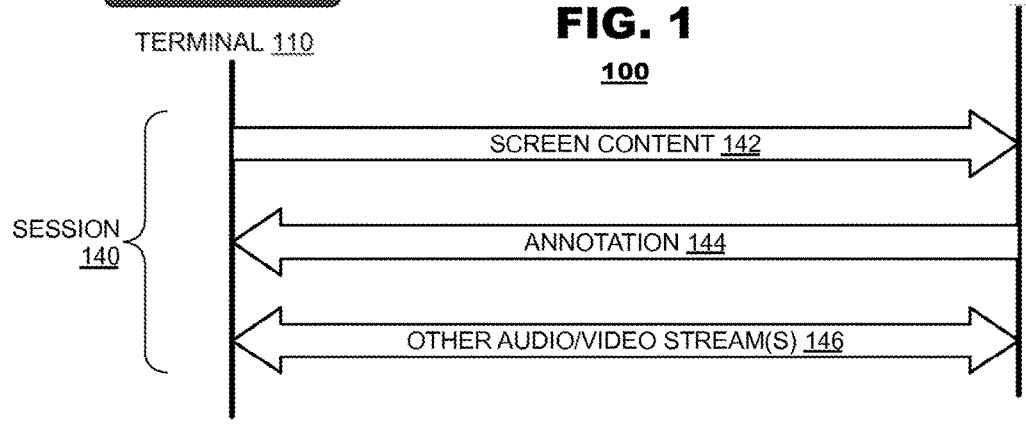
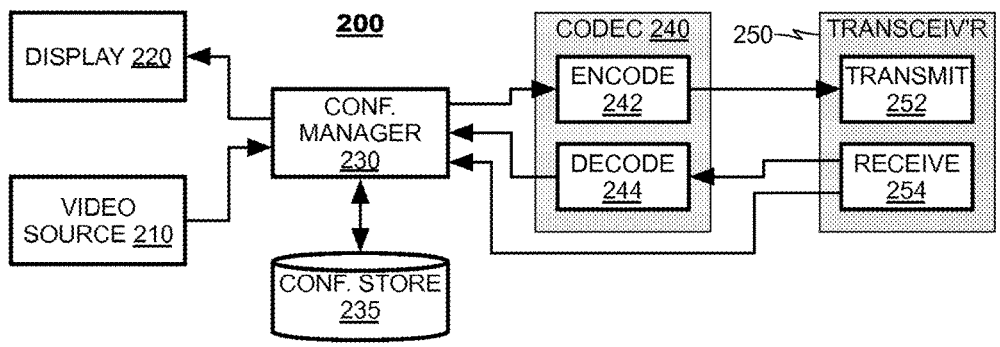

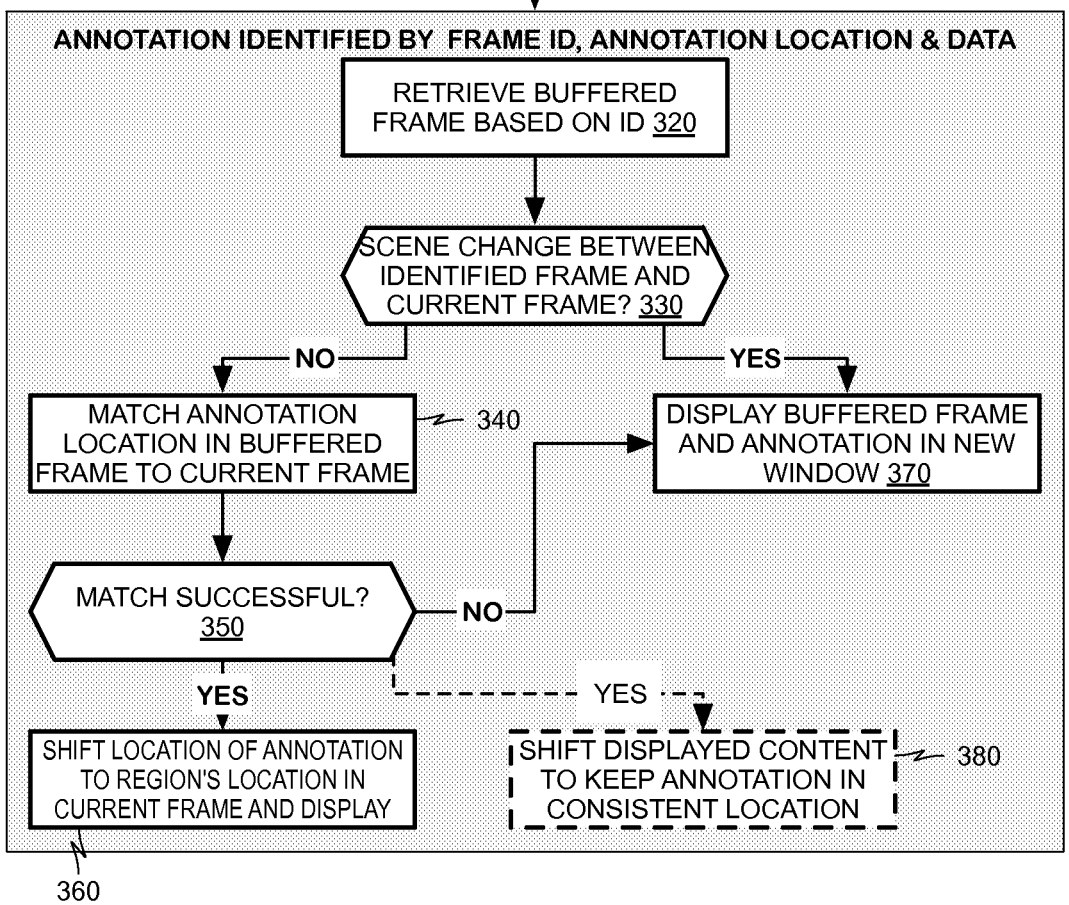

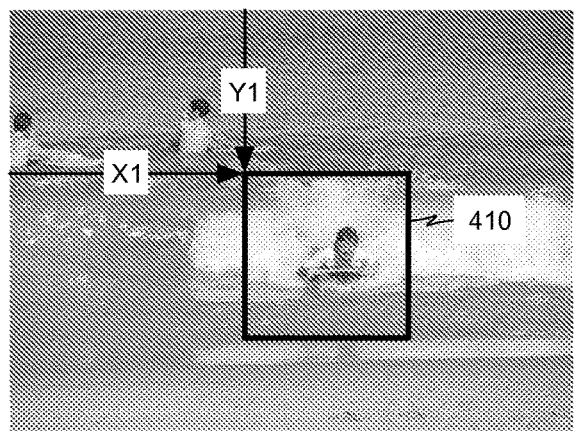
Frame: F1  (a)
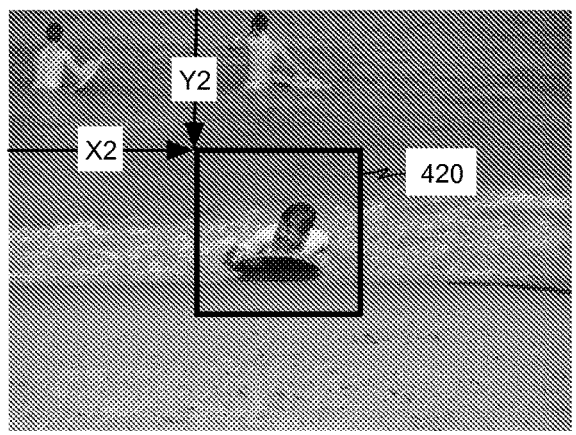
Frame: F2  (b)
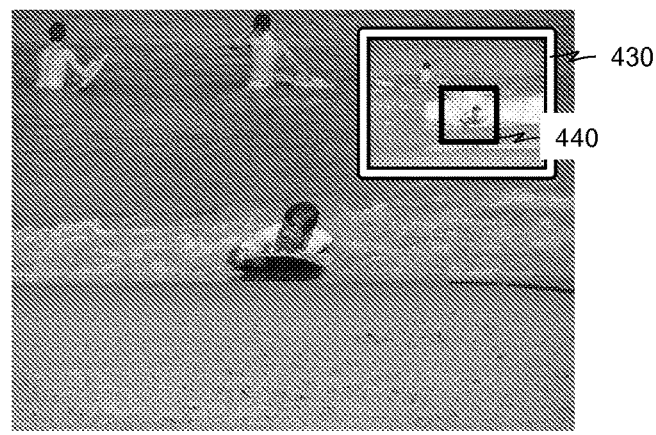
Frame: F2  (c)
FIG. 4

500

700

800

US 11,206,371 B2

TECHNIQUES TO OVERCOME COMMUNICATION LAG BETWEEN TERMINALS PERFORMING VIDEO MIRRORING AND ANNOTATION OPERATIONS

CLAIM FOR PRIORITY

This application is a continuation of and benefits from application Ser. No. 14/727,471, filed Jun. 1, 2015 and entitled "Techniques to Overcome Communication Lag Between Terminals Performing Video Mirroring and Annotation Operations," the disclosure of which is incorporated herein in its entirety.

BACKGROUND

The present disclosure relates to conferencing applications involving exchange and annotation of video and, specifically, to techniques for mitigating aberrant rendering artifacts induced by communication delay among conference participants.

Conferencing applications are becoming increasingly popular tools in modern computing applications. Video conferencing applications, which once were cost-prohibitive for all except perhaps the largest of enterprises, now are widely available to the ordinary consumer. Now, many personal computers, laptop computers, tablet computers and smart phones come equipped with cameras and video conferencing applications that support real time video conferencing over the Internet.

The inventors desire to increase the capability of such conferencing applications. In particular, the inventors desire to add functionality that allows recipients of streamed video to make annotations to the video and share them with other conference participants. Such functionality adds complications, however, because, at the time a recipient adds an annotation to a frame being displayed at the recipient's device, that frame no longer is being displayed at the device from which it originated. Instead, the frame has been replaced by another frame at the originating terminal.

Processing delays are induced between terminals by various factors, including video compression, transmission and decompression operations. In the case of video streamed from one device to another, these delays cause a given frame (such as the frame that will be annotated) to be displayed then removed from an originating device before it is displayed at a receiving device. Network transmission can be a major contributor to such delays. Processing delays also cause delay in transmission of annotation data from a receiving device to an originating device. Thus, when an annotation is rendered at an originating device, it may appear to be out of sync with respect to the video it is intended to reference.

Accordingly, the inventors perceive a need in the art for techniques that support annotation to video data that is streamed between devices even in the presence of communication delays among such devices.

BRIEF DESCRIPTION OF THE DRAWINGS

FIG. 1 illustrates a video conferencing system according to an embodiment of the present disclosure.
FIG. 2 is a functional block diagram of a terminal according to an embodiment of the present disclosure.
FIG. 3 illustrates a method according to an embodiment of the present disclosure.
FIG. 4 illustrates exemplary annotations that may be generated according to the present disclosure.

DETAILED DESCRIPTION

Figure 5:
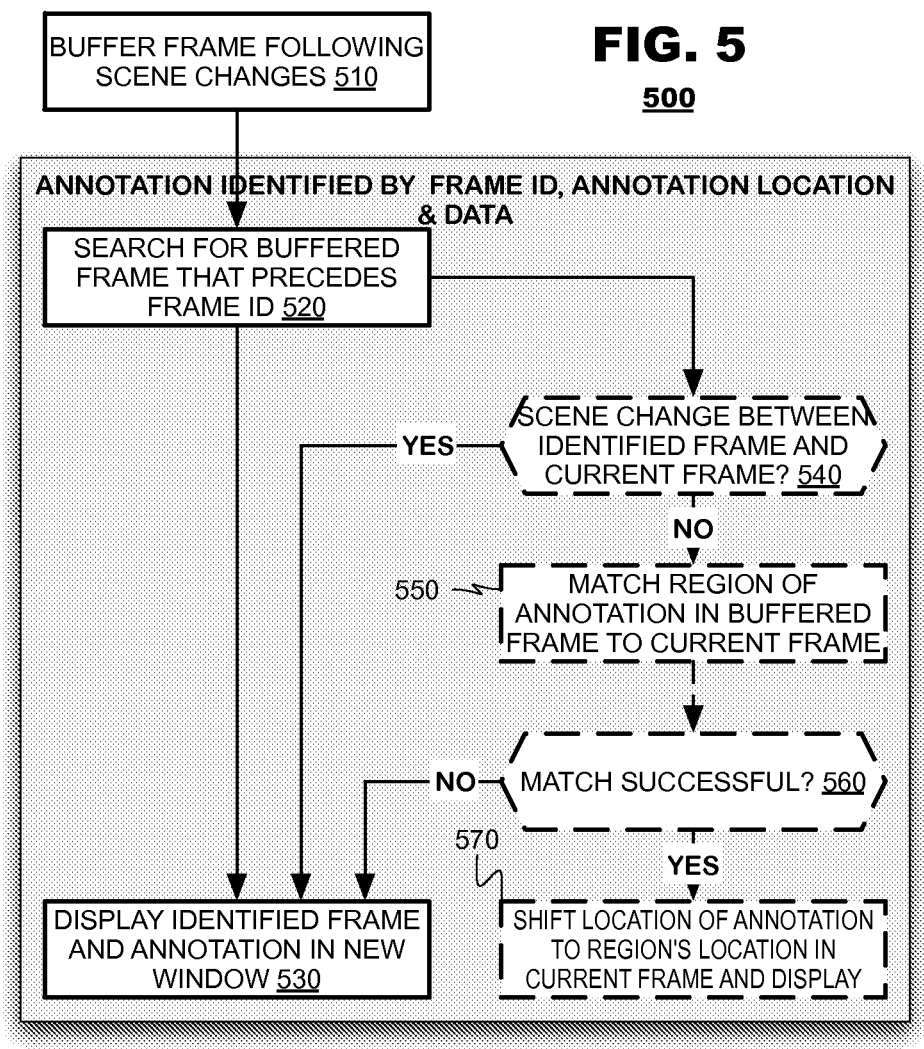
FIG. 5 illustrates a method according to another embodiment of the present disclosure.

Embodiments of the present invention provide techniques for overcoming communication lag between interactive operations among devices in a streaming session. According to the techniques, a first device streams video content to a second device. An annotation is entered to a first frame being displayed at the second device, which is communicated back to the first device. Responsive to a communication that identifies the annotation, a first device may identify an element of video content from the first frame to which the annotation applies and determine whether the identified element is present in a second frame of video content currently displayed at the first terminal. If so, the first device may display the annotation with the second frame in a location where the identified element is present. If not, the first device may display the annotation via an alternate technique.

FIG. 1 illustrates a video conferencing system 100 according to an embodiment of the present disclosure. The system 100 may include a pair of terminals 110, 120 and a communication network 130. The terminals 110, 120 may support an interactive communication session between them that includes exchange of video information, audio information and metadata information.

The system 100 may establish a communication session 140 that supports screen mirroring and annotations between terminals 110, 120, where screen content of a first terminal 110 (called a "mirroring terminal" herein) is supplied to a second terminal 120 (a "far-end terminal") for display and where data representing annotations to the mirroring terminal's content that are entered at the far-end terminal 120 are provided back to the mirroring terminal 110. The communication session 140 may include an exchange of a first stream 142 of data representing screen content of the mirroring terminal 110 that is provided to the far-end terminal 120. The communication session 140 may include an exchange of a second stream 144 of metadata representing the annotation made to the mirroring terminal 110 at the far-end terminal 120.

The screen mirroring and annotation operations 142, 144 may be a part of a larger communication session 140 between the terminals 110, 120. This communication session 140 may include exchange of other data stream(s) 146, such as bidirectional exchange of audio to carry spoken voice, unidirectional exchange of supplementary video to carry video of conference participants, and perhaps download of data from external sources such as media servers (not shown). The present discussion is limited to description of features that relate to the screen mirroring and annotation functions of the present disclosure and, while these features may work cooperatively with exchange of other data streams 146, terminal operation involving those other data streams 146 is immaterial to the screen mirroring and annotation features unless described herein.

In the example of FIG. 1, the terminals 110, 120 are illustrated as tablet computers and notebook computers, respectively, but the principles of the present invention are not so limited. Embodiments of the present invention find application with personal computers (both desktop and laptop computers), smart phones, computer servers, media players and/or dedicated video conferencing equipment. The network 130 represents any number of networks that convey coded video data between the terminals 110, 120, including, for example, wireline and/or wireless communication networks. The communication network 130 may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present invention unless explained hereinbelow.

FIG. 2 is a simplified functional block diagram of a terminal 200 according to an embodiment of the present disclosure. The terminal 200 may include a video source 210, a display 220, a conference manager 230, a codec 240, and a transceiver 250. The conference manager 230 may perform operations to support a communication session with another terminal (not shown), including exchange of screen content and/or annotations, as desired. The video source 210 may provide video data to the conference manager 230 that will be mirrored with the other terminal during a communication session. The display 220 may display video output of the communication session locally at the terminal 200. The codec 240 may perform video compression/decompression operations in support of the communication session. The transceiver 250 may perform network transmission operations in support of the communication session.

As discussed, the video source 210 may supply video to the conference manager 230 for exchange with other terminals. A variety of types of screen content may be mirrored to another terminal. For example, the video source 210 may be a camera that captures video locally at the terminal 200. Alternatively, the video source 210 may be a storage device that stores video locally at the terminal 200, which may have been captured by a camera at some earlier time. In yet another embodiment, the video source 210 may be an application that executes locally at the terminal 200 and generates video for output to a display. Indeed, the conference manager 230 may be configured to exchange a predetermined portion of a terminal's screen display, without regard to the number of application(s) that may be active within the area being exchanged.

The codec 240 may perform compressions and/or decompressions on video information as needed in support of the communication session. For example, if screen content is to be mirrored to another terminal (not shown), an encoder 242 may compress a video stream representing the mirrored screen content. Compression operations typically exploit spatial and/or temporal redundancies in the video stream to reduce its bandwidth. Moreover, if screen content is to be mirrored from another terminal, for example, transmitted from another terminal for display locally at the terminal 200, a decoder 244 may decompress a compressed video stream representing the mirror screen content. Decompression operations typically invert compression operations that were applied by an encoder of another terminal (not shown) to recover a source video stream. The codec 240 also may perform compression and/or decompression operations on other video streams, such as streams 146 (FIG. 1). Compression/decompression operations may be lossy processes, in which case, a recovered video stream may exhibit some loss of content with respect to its source video stream. In an embodiment, the codec 240 may operate according to a predetermined coding protocol such as HEVC/H.265, H.264, MPEG-4and the like.

The transceiver 250 may perform transmission and/or reception operations on data representing the communication session. The transceiver 250 may include a transmitter 252 that may format coded session data into transmission units for transmission to a network (not shown). The transceiver 250 may merge session data from a variety of sources, including coded video data from the encoder 242, coded audio data from an audio codec (not shown), session control information from a controller (not shown) and other sources of ancillary streams (also not shown). The transceiver 250 may build a unitary transmission stream from these sources, format the transmission stream into transmission units that are appropriate for communication via the network, schedule the transmission units for transmission and ultimately transmit those transmission units as scheduled.

The transceiver 250 also may include a receiver 254 for reception of data transmitted to the terminal 200 from other sources, including another terminal (not shown). The receiver 254 may receive transmission units from the network (not shown), buffer them to reconstruct a received data stream therefrom, parse the received data stream into its constituent elements and distribute those elements to appropriate processing elements. For example, with respect to coded video data received from the other terminal (not shown), the receiver 254 may provide the coded video data to a decoder 244 in the codec 240.

The conference manager 230 may perform operations to enable the screen mirroring and/or annotation features as dictated by session control operations. For example, the conference manager 230 may engage screen mirroring in response to user commands entered at the terminal via an input device (not shown). If a user command identifies a sub-set of screen content to be exchanged, the conference manager 230 may build a video stream from the identified sub-set and feed it to the codec 240 for transmission to the other terminal. Alternatively, if the user command does not identify which screen content is to be exchanged, the conference manager 230 may build the video stream from a default set of content, for example, a currently-active window being displayed at the terminal 200 or the entirety of screen information being displayed at the terminal 200. The conference manager 230 also may respond to user command(s) identifying private content and may redact such content from the video stream even if it ordinarily would be exchanged according to default conferencing rules. The conference manager 230 may store all or a portion of the video stream it feeds to the codec 240 in local storage 235, called a "conference store" herein.

The conference manager 230 may present annotations on a local display 220 when it receives data 144 (FIG. 1) representing such annotations from another terminal. The conference manager 230 may interpret annotation data received from the network and, in certain applications of the present disclosure, merge it with video data received either from the network or from the conference store 235 before rendering it on the display 220. The embodiments are discussed hereinbelow.

Although the discussion of FIG. 1 makes reference to a mirroring terminal 110 and a far-end terminal 120, these labels are employed merely to distinguish between terminal roles in a given conference. In practice, a single terminal 200 may operate in the role as a mirroring terminal or as a far-end terminal (and, sometimes, as both types of terminals) as dictated by user control. The conference manager 230, therefore, may include software control to stream video to other devices when the terminal 200 is commanded to operate as a mirroring terminal and also may include software control to add annotations and transmit them to other devices when the terminal 200 is commanded to operate as a far-end terminal.

FIG. 2, as discussed, is a simplified functional block diagram only. In practice, the terminal 200 may include other components (not shown) to support other functionality of the communication session, including input/output devices and codecs for audio, user interface controls and the like. Such components are omitted from FIG. 2 merely to simplify the present discussion.

FIG. 3 illustrates a method 300 according to an embodiment of the present disclosure. According to the method 300, a terminal may buffer all frames that it transmits to a far-end terminal (box 310). When a far-end terminal reports an annotation, the annotation may be identified by a frame identifier, an annotation location and data representing the annotation. In response, the method 300 may retrieve the frame referenced by the frame identifier from buffer storage (box 320). The method 300 may determine whether a scene change has occurred between the frame referenced by the frame identifier and a current frame being displayed at the terminal (box 330). If no scene change has occurred, the method 300 may attempt to match a location of the annotation in the buffered frame to a location in the current frame being displayed (box 340). If the match is successful (box 350), the method may display the annotation shifted to a location in the current frame that matches the annotation in the buffered frame (box 360). If the match is unsuccessful, then the method 300 may display the buffered frame and annotation in a new window at the terminal (box 370).

In another embodiment, the method 300 may shift display of video at the mirroring terminal to center the annotation and its associated content within a display window of the mirroring terminal (box 380). Alternatively, the method 300 may shift display of video at the mirroring terminal to keep the annotation and its associated content at a location identified by the report received from the far-end terminal.

FIG. 4 illustrates exemplary annotations that may be generated by the method of FIG. 3. FIG. 4(*a*) illustrates a frame that may be displayed at a far-end terminal when an annotation is created. The frame may have an identifier F1 associated with it. As illustrated, the annotation may be a rectangle drawn over a portion of the mirrored screen content having its origin at a position X1, Y1 within the area of the displayed content. In this example, the far-end terminal may transmit to the mirroring terminal annotation information that indicates the annotation was entered at frame F1, which identifies its location as X1, Y1 and also identifies information about the annotation itself (e.g., the type of annotation created, its size and other properties that may be defined by an operator).

FIG. 4(*b*) illustrates a frame that may be displayed at the mirroring terminal when the annotation information is received from the far-end terminal. The displayed frame will have a likely frame identifier that is advanced from the frame identifier that represents the frame at which the annotation information was entered (e.g., F2>F1). In this example, the mirroring terminal has identified a match between frame content in the location of frame F1 where the annotation was entered and frame content in the frame F2 currently being displayed. The mirroring terminal may display a corresponding annotation 420 at a location, shown as X2, Y2, where the matching content appears in frame F2.

FIG. 4(*c*) illustrates exemplary output of a mirroring terminal in an event that the method 300 (FIG. 3) could not match the annotation to content in frame F2. In this case, the method 300 may open a new window 430 and display content of the buffered frame F1 and the annotation 440 in a new window 430.

Matching operations may be performed in a variety of ways. Many modern image processing systems perform motion tracking of image content from frame to frame, either as part of or preparatory to performing motion compensated prediction. A conference manager 230 (FIG. 2) may store such motion estimates and utilize them to trace an annotation location across frames to estimate a location of annotated content in a current frame (e.g., from frame F1 to frame F2 in the example of FIG. 4). Other processing systems employ object recognition, such as face recognition, to recognize objects within frame data. A processing system may perform object recognition on an annotation location within an annotated frame F1, and search for a matching object in the currently-displayed frame F2 in an effort to match the annotation to the currently-displayed frame.

In another embodiment, a processing system may augment matching operations with audio processing or recognition processes. For example, a terminal may receive audio from a far-end terminal while receiving an annotation. In such an embodiment, the terminal may perform object recognition on image data and voice recognition and/or natural langue processing algorithms on audio data. If the terminal identifies content of the audio (for example, the phrase "look at this bird" is recognized), it may attempt to match audio content with image content identified by object recognition. If object recognition detects a bird in the video frame, it may identify an image region that contains the matching object as the region corresponding to the annotation.

FIG. 5 illustrates a method 500 according to another embodiment of the present disclosure. According to the method 500, a terminal that mirrors its screen content to another terminal may buffer only the frames that follow scene changes (box 510). When the method 500 receives data indicating that an annotation has been entered at another terminal, the annotation data may identify the annotated frame by its frame ID. In response, the method 500 may search in the conference store for a buffered frame having a frame ID that precedes the frame ID identified in the annotation data (box 520). If a matching frame is identified, the method 500 may retrieve the buffered frame and display it in a new window, along with the annotation (box 530).

Alternatively, when a matching frame is identified, the method 500 may determine whether a scene change has occurred between the matching frame that is identified in the conference store and a current frame being displayed (box 540). If a scene change has occurred, then the method 500 may advance to box 530 and cause the buffered frame to be displayed in a new window, along with the annotation. If a scene change has not occurred, however, the method 500 may attempt to match a region in the buffered frame that is referenced by the annotation to image content in the current frame being displayed (box 550). If the match is successful (box 560), the method 500 may shift display of the annotation to a location of the matching region of the current frame (box 570). If not, however, then the method may advance to box 530.

In another embodiment, a far-end terminal may send an annotation along with a compressed representation of the annotated video frame that it was displaying at the time of the annotation. The far-end terminal may compress the video frame independently of other frames that it transmits to the near end terminal. Alternatively, it may be compressed using a frame stored by the mirroring terminal as a prediction reference, for better compression efficiency. In this latter embodiment, the reference frame would be a frame initially used by the mirroring terminal to code video data sent from the mirroring terminal to the far end terminal; when used for purposes of annotation, the mirroring terminal may re-use the reference frame as a prediction reference for coding of the annotated frame and transmission back to the mirroring terminal.

Figure 6:
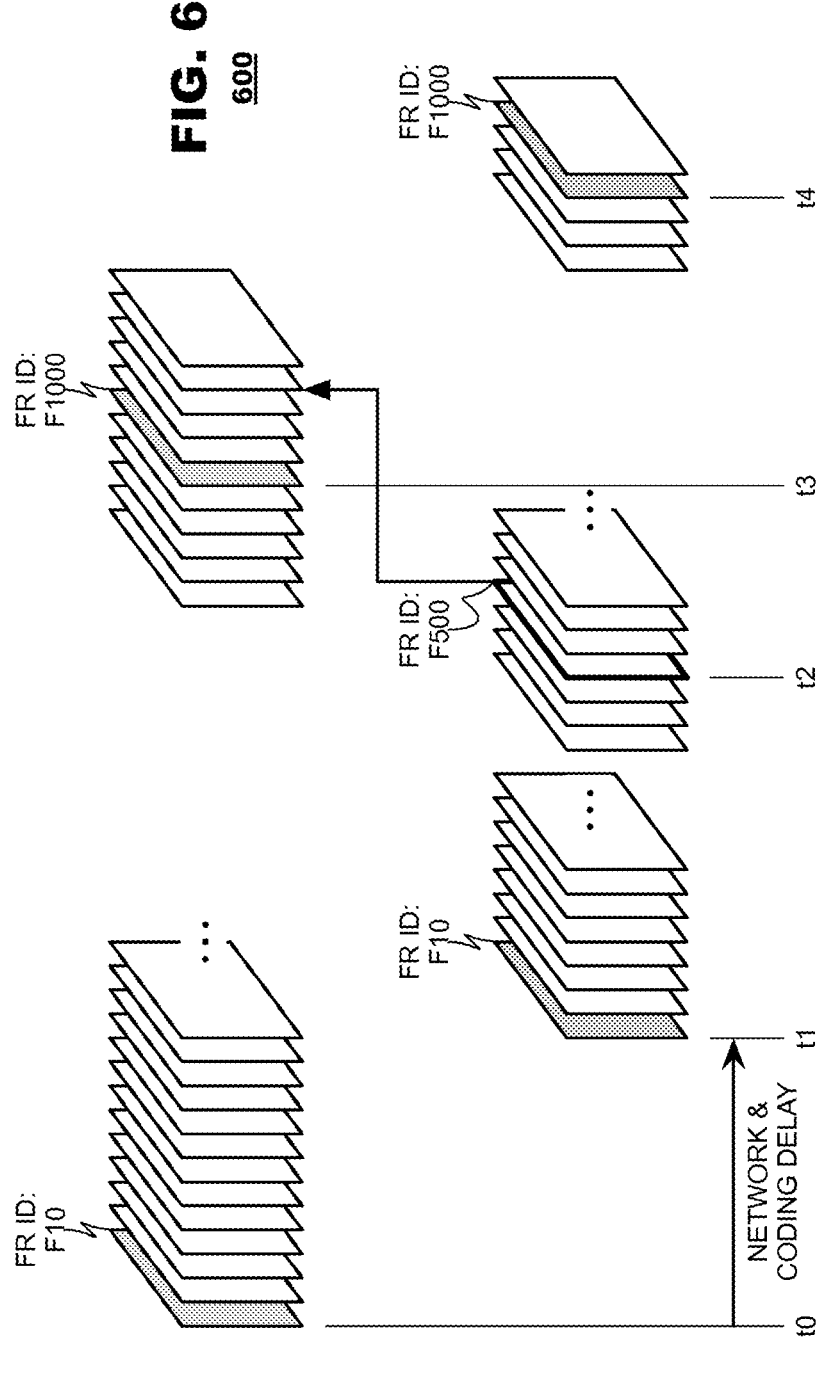
FIG. 6 illustrates a coding timeline that illustrates exemplary interplay between terminals operating according to an embodiment of the present disclosure.

FIG. 6 illustrates a coding timeline 600 that illustrates exemplary interplay between a mirroring terminal 610 and an annotating terminal 620 operating according to the method of FIG. 5. During operation, the mirroring terminal 610 may recognize scene changes at frames preceding frames F10 and F1000. The mirroring terminal 610 may store these frames locally. It may code and transmit to the annotating terminal 620 all frames designated by a user as subject to the mirroring operation. In this example, assume that the mirrored video includes frames having frame IDs F10-F1000.

The annotating terminal 620 may render the mirrored video at some time later than the rendering times of those frames at the mirroring terminal 610. Thus, where FIG. 6 illustrates frame F10 as being rendered by the mirroring terminal 610 at time t0, frame F10 may be rendered by the annotating terminal 620 at time t1, owing to delays induced by coding, transmission and decoding. Similarly, FIG. 6 illustrates frame F1000 being rendered by the mirroring terminal 610 at time t3 but being rendered by the annotating terminal 620 at time t4. Although FIG. 6 illustrates these delays as being identical for each rendered frame, in practice, the delays are likely to be variable.

In the example of FIG. 6, a user may begin an annotation at frame F500 at time t2. The annotating terminal 620 may transmit data representing the annotation back to the mirroring terminal, which may not be received by the mirroring terminal until sometime after frame F1000 was rendered. The mirroring terminal 610 may identify which of the buffered frames F10 and F1000 have a frame ID that precedes frame ID F500 (in this case, frame F10). The mirroring terminal 610 also may determine that a scene change has occurred between frame F10 and the frame currently being displayed. Accordingly, the mirroring terminal 610 may cause the buffered frame F10 to be displayed with the annotation entered at frame F500.

The method of FIG. 5 may conserve resources in a way that other mirroring systems may not. As compared to the embodiment of FIG. 3, for example, the method 500 of FIG. 5 may require only frames that follow a scene change to be stored by a terminal. The embodiment of FIG. 3, however, causes all mirrored frames to be buffered for a corresponding time. Accordingly, storage resources required to implement the method of FIG. 5 likely will be reduced as compared to other embodiments.

A variety of scene change detection techniques may be used. For example, discontinuous operation of a camera or switches among cameras in a multi-camera system (e.g., front camera to back camera or vice versa) may cause corresponding discontinuities in video supplied by the camera. For video streams generated by applications or video production systems, scene changes may be detected by frame-by-frame comparisons that detect loss of correlation between frames. Similarly, losses of correlations may be induced by rapid movement of a continuously-operating camera, which causes the camera to capture information from a first angular position, then from a second angular position that replaces image information in the camera's field of view; such position changes may be detected by a motion sensor such as a gyroscope or accelerometer. The principles of the present disclosure may work cooperatively with any of these scene change detection techniques.

Figure 7:
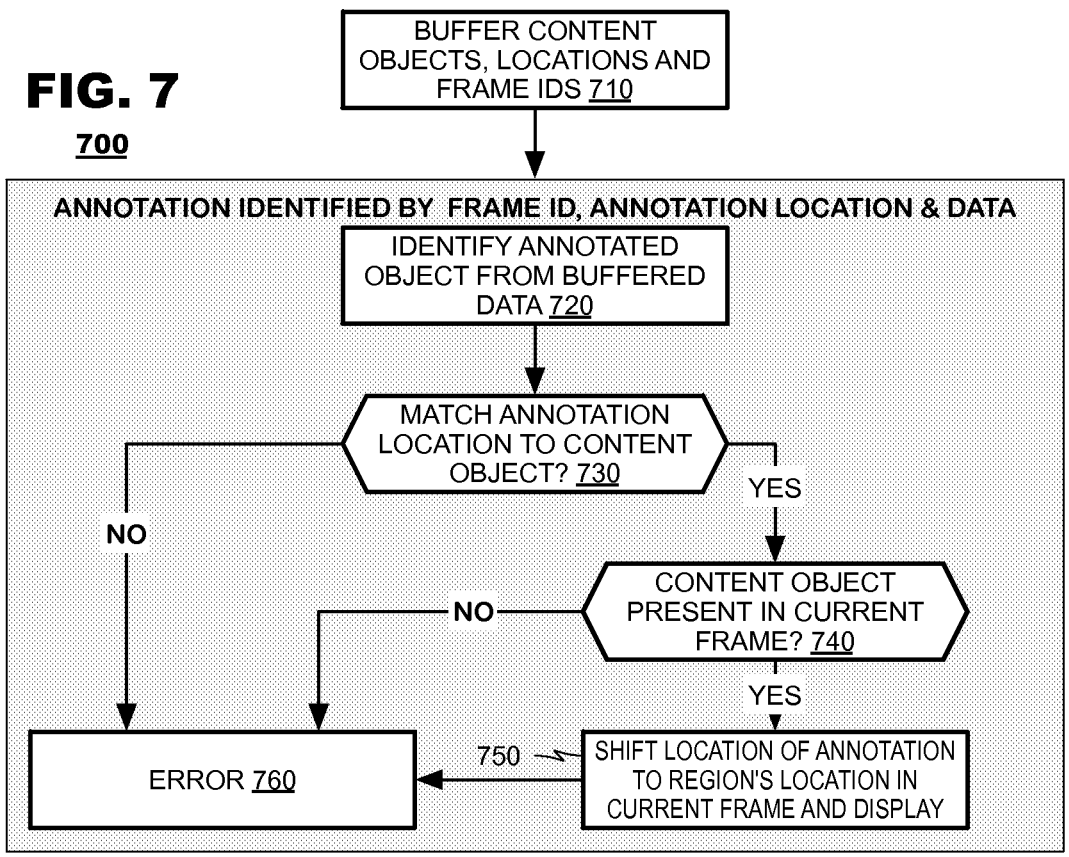
FIG. 7 illustrates a method according to another embodiment of the present disclosure.

FIG. 7 illustrates a method 700 according to another embodiment of the present disclosure. According to the method 700, a conference manager has access to processes resident at a terminal (such as an operating system or applications) that build screen content from various video sources. The method 700, therefore, may identify screen objects that correspond to different locations of mirrored screen content. As the conference manager streams mirrored video to another terminal, the method 700 may store information identifying, for each mirrored frame, the object(s) in the mirrored content and their corresponding location(s) (box 710).

When the method 700 receives data identifying an annotation, the annotation may be identified by frame ID, the annotation's location and data defining how the annotation is to be rendered. In response to the annotation data, the method 700 may identify and retrieve a buffered frame that corresponds to the annotation location (box 720). It may attempt to identify an object that is subject to the annotation (box 730). If the method 700 recognizes the object that is subject to the annotation, the method 700 may determine whether that object is present in the currently displayed frame (box 740). If so, the method 700 may shift the location of the annotation to the location of the object in current frame and display the annotation (box 750).

If the annotation could not be matched to a content object (box 730) or the content object no longer appears in the current frame (box 740), the method 700 may enter an error condition (box 760). The method 700 may respond to an error condition in a variety ways. First, the method 700 simply may display the annotation at its identified location notwithstanding the fact that its associated content object has not been located. This response may be appropriate in implementations where some portions of screen content may not map to identified objects (for example, background elements). It also may be appropriate in object-based implementations where the annotated content object has been removed from view. The loss of the annotated content object will become apparent at the annotating terminal once it is rendered and an operator likely will remove the annotation on his/her own volition.

Alternatively, when an annotated content object is no longer in screen content, the method 700 may display an error indication at the annotating terminal (not shown). The notification may indicate that annotation data was received but cannot be rendered.

Further, when an annotated content object is no longer in screen content, the method 700 may cause an error notification to be transmitted from the mirroring terminal to an annotating terminal that originated the annotation. In response, the annotating terminal may remove the annotation (not shown) or prompt the operator to relocate the annotation so it better matches to content objects displayed at the annotating terminal.

Figure 8:
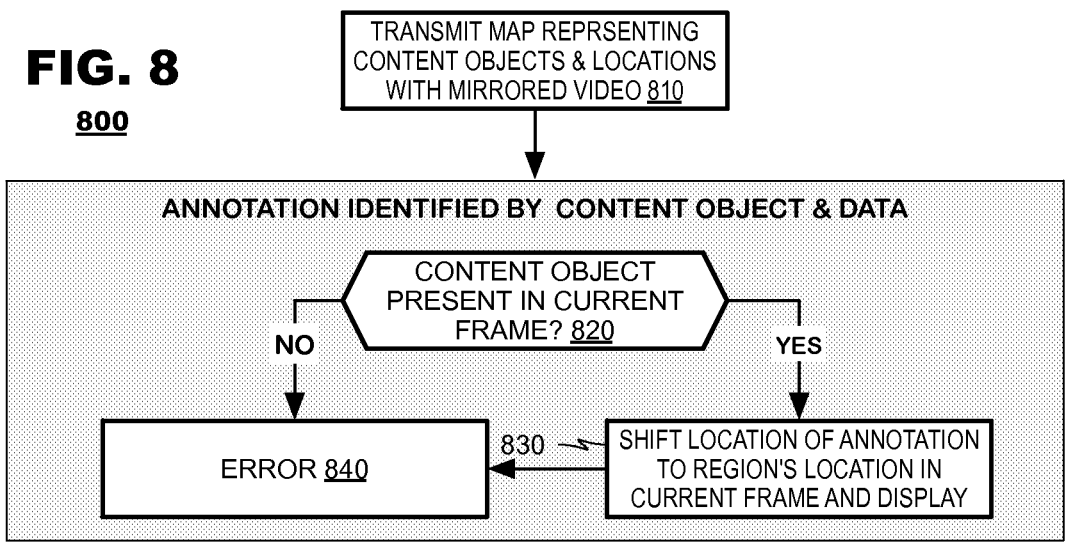
FIG. 8 illustrates a method according to a further embodiment of the present disclosure.

FIG. 8 illustrates a method 800 according to another embodiment of the present disclosure. In this embodiment, the method 800 may have access to applications and/or operating system elements that generate video content to be mirrored to a far-end device. As the conference manager streams mirrored video to another terminal, the method 800 may transmit a metadata map that contains identifiers of content objects in the mirrored video, which may be supplied by these applications and/or operating system elements, and locations within the frames that the objects occupy (box 810).

When a user at a far-end terminal adds an annotation to the mirrored video, a far-end terminal may report the annotation by identifying an object identifier that is associated with the annotation's location and data representing the annotation. The method 800 may determine whether the content object is present in a current frame being displayed at the mirroring terminal (box 820). If the content object is present in the current frame, then the method may shift the annotation to a location where the content object is located in the current frame (box 830), which depending on object movement may or may not be in the same location as in the annotated frame. If the content object is not present in the current frame, then the method 800 may respond to an error condition (box 840) as discussed in any of the foregoing embodiments.

In another embodiment, video mirroring may be performed for video content that is generated by an application that is executing concurrently on both the near end terminal and the far-end terminal. In such an embodiment, the far-end terminal may identify an annotation by identifying an application object to which the annotation refers. Then, the method may operate in a manner that is analogous to box 830 by determining whether the application object is currently displayed by the near end terminal. If so, the method may display the annotation over the application object. If not, the method may respond to an error condition as discussed hereinabove.

The foregoing discussion has described operation of the embodiments of the present disclosure in the context of terminals that embody encoders and/or decoders. Commonly, these components are provided as electronic devices. They can be embodied in integrated circuits, such as application specific integrated circuits, field programmable gate arrays and/or digital signal processors. Alternatively, they can be embodied in computer programs that execute on personal computers, notebook computers, tablet computers, smartphones or computer servers. Such computer programs typically are stored in physical storage media such as electronic-, magnetic- and/or optically-based storage devices, where they are read to a processor under control of an operating system and executed. Similarly, decoders can be embodied in integrated circuits, such as application specific integrated circuits, field-programmable gate arrays and/or digital signal processors, or they can be embodied in computer programs that are stored by and executed on personal computers, notebook computers, tablet computers, smartphones or computer servers. Decoders commonly are packaged in consumer electronics devices, such as gaming systems, DVD players, portable media players and the like; and they also can be packaged in consumer software applications such as video games, browser-based media players and the like. And, of course, these components may be provided as hybrid systems that distribute functionality across dedicated hardware components and programmed general-purpose processors, as desired.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure.

We claim:

1. A method of annotating data between terminals, comprising:
    decoding and displaying coded video received from a distant terminal in a first direction of communication, the coding and decoding of the coded video is relative to reference frames stored by the terminals for decoding in the first direction of communication,
    responsive to an annotation entered by a user, coding according to predictive coding techniques a displayed frame being annotated, the coding using a prediction reference from at least one of the reference frames stored by the terminals, and
    transmitting the coded frame and data representing the annotation to the distant terminal in a second direction of communication.

2. The method of claim 1, wherein the transmitting includes transmitting a frame identifier (ID) of a first frame buffered at the distant terminal and a location of the annotation in the first frame.

3. The method of claim 1, wherein the transmitting includes transmitting an object identifier representing an object in a first frame at the distant terminal corresponding to the displayed frame.

4. The method of claim 1, wherein the transmitting includes identifying an object in the coded video generated by an application executing in common on a local device and the distant terminal.

5. The method of claim 1, wherein the transmitting includes audio content identifying an object in the annotated coded video.

6. The method of claim 1, wherein the transmitting includes identifying the annotation including a type of the annotation, a size of the annotation, and at least one additional property of the annotation as defined by the operator of a local device.

7. A computer system, comprising:
    at least one processor;
    at least one memory comprising instructions configured to be executed by the at least one processor to perform a method comprising:
    decoding and displaying coded video received from a distant terminal in a first direction of communication, the coding and decoding of the coded video is relative to reference frames stored by the terminals for decoding in the first direction of communication,
    responsive to an annotation entered by a user, coding according to predictive coding techniques a displayed frame being annotated, the coding using a prediction reference from at least one of the reference frames stored by the terminals, and
    transmitting the coded frame and data representing the annotation to the distant terminal in a second direction of communication.

8. The system of claim 7, wherein the transmitting includes transmitting a frame identifier (ID) of a first frame buffered at the distant terminal and a location of the annotation in the first frame.

9. The system of claim 7, wherein the transmitting includes transmitting an object identifier representing an object in a first frame at the distant terminal corresponding to the displayed frame.

10. The system of claim 7, wherein the transmitting includes identifying an object in the coded video generated by an application executing in common on a local device and the distant terminal.

11. The system of claim 7, wherein the transmitting includes audio content identifying an object in the annotated coded video.

12. The system of claim 7, wherein the transmitting includes identifying the annotation including a type of the annotation, a size of the annotation, and at least one additional property of the annotation as defined by the operator of a local device.

13. A non-transitory computer-readable medium comprising instructions executable by at least one processor to perform a method, the method comprising:
  decoding and displaying coded video received from a distant terminal in a first direction of communication, the coding and decoding of the coded video is relative to reference frames stored by the terminals for decoding in the first direction of communication,
  responsive to an annotation entered by a user, coding according to predictive coding techniques a displayed frame being annotated, the coding using a prediction reference from at least one of the reference frames stored by the terminals, and
  transmitting the coded frame and data representing the annotation to the distant terminal in a second direction of communication.

14. The medium of claim 13, wherein the transmitting includes transmitting a frame identifier (ID) of a first frame buffered at the distant terminal and a location of the annotation in the first frame.

15. The medium of claim 13, wherein the transmitting includes transmitting an object identifier representing an object in a first frame at the distant terminal corresponding to the displayed frame.

16. The medium of claim 13, wherein the transmitting includes identifying an object in the coded video generated by an application executing in common on a local device and the distant terminal.

17. The medium of claim 13, wherein the transmitting includes audio content identifying an object in the annotated coded video.

18. The medium of claim 13, wherein the transmitting includes identifying the annotation including a type of the annotation, a size of the annotation, and at least one additional property of the annotation as defined by the operator of a local device.

* * * * *